United States Patent
Bries et al.

(10) Patent No.: US 6,641,910 B1
(45) Date of Patent: Nov. 4, 2003

(54) STRETCH RELEASING ADHESIVE TAPE WITH SEGMENTED RELEASE LINER

(75) Inventors: James L. Bries, Cottage Grove, MN (US); Ronald C. Johansson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/382,177

(22) Filed: Aug. 24, 1999

(51) Int. Cl.$^7$ .............................. C09J 7/02; B32B 15/04; A47G 1/17
(52) U.S. Cl. ..................... 428/343; 428/40.1; 428/56; 428/58; 428/121; 428/124; 428/126; 428/192; 428/906; 248/205.3; 248/304
(58) Field of Search ................. 428/354, 40.1, 428/343, 58, 56, 906, 192, 121, 124, 126; 248/304, 205.3

(56) References Cited

U.S. PATENT DOCUMENTS

| | | | |
|---|---|---|---|
| 3,663,343 A | * 5/1972 | Buck | 161/39 |
| 4,024,312 A | * 5/1977 | Korpman | 428/343 |
| 5,044,776 A | * 9/1991 | Schramer et al. | 383/89 |
| 5,318,658 A | * 6/1994 | Goodman | 156/484 |
| 5,491,012 A | 2/1996 | Lühmann et al. | 428/40 |
| 5,509,694 A | * 4/1996 | Laurash | 283/81 |
| 5,516,581 A | 5/1996 | Kreckel et al. | 428/317.3 |
| 5,580,413 A | * 12/1996 | Assink et al. | 156/361 |
| 5,747,131 A | 5/1998 | Kreckel | 428/40.1 |
| 6,238,760 B1 | * 5/2001 | Majumdar et al. | 428/40.1 |

FOREIGN PATENT DOCUMENTS

| | | |
|---|---|---|
| DE | 2909276 A | 9/1980 |
| DE | 3331016 | 7/1992 |
| DE | 19721169 A | 11/1998 |
| GB | 1422364 A | 1/1976 |
| WO | WO 95/06691 | 3/1995 |
| WO | WO 97/07172 | 2/1997 |
| WO | WO 98/06652 | 2/1998 |
| WO | WO 98/21285 | 5/1998 |
| WO | WO 99/31193 | 6/1999 |

* cited by examiner

Primary Examiner—Daniel Zirker
Assistant Examiner—Victor Chang
(74) Attorney, Agent, or Firm—David B. Patchett

(57) ABSTRACT

A stretch releasing adhesive tape article includes an elongate length of stretch releasing adhesive tape and a segmented liner arranged on the adhesive that can be used to form a manually engageable pull tab at a selected location on a discrete strip of tape cut from the length of tape. Each segment of the liner can be individually removed from the tape. The segmented liner allows the adhesive tape to be made in any length and wound upon itself to form a roll, and allows a user to cut a strip having a selected length depending on the end use application for the strip, and further allows the user to form a manually engageable non-adhesive pull tab at any location on the strip which can be grasped and pulled by a user to stretch remove the tape from a substrate.

21 Claims, 5 Drawing Sheets

STRETCH RELEASING ADHESIVE TAPE WITH SEGMENTED RELEASE LINER

FIELD OF THE INVENTION

The present invention relates generally to stretch releasing adhesive tapes for removably adhesively bonding an object to a surface. More particularly, the present invention relates to a single or double-sided stretch releasing adhesive tape article that can be made in an elongated strip of indefinite length which can be cut to a selected length depending on the end use application for the tape, and a pull tab for stretch removing the tape can be formed at any location along the tape using a segmented liner.

BACKGROUND OF THE INVENTION

Stretch releasing adhesive tapes represent an emerging class of high performance pressure-sensitive adhesives combining strong holding power with clean removal and no surface damage. Such stretch releasing adhesive tapes are useful in a wide variety of assembling, joining, attaching, and mounting applications.

Adhesive tape strips which can be cleanly removed from a surface by stretching the tape strip are known in the patented prior art. The Korpman U.S. Pat. No. 4,024,312, for example, discloses a highly conformable adhesive tape including a highly extensible and elastic backing film laminated with an adhesive layer. The backing film possesses a lengthwise elongation at break of at least about 200%. The tape is easily stretchable and may be removed from a surface by stretching the tape lengthwise in a direction substantially parallel to the surface. German Patent No. 33 31 016 discloses a high elasticity, low plasticity adhesive film based on a thermoplastic rubber and tackifying resins, wherein the adhesive bond can be broken by stretching the adhesive film in the direction of the plane of the adhesive bond.

The Kreckel et al. U.S. Pat. No. 5,516,581, assigned to the same assignee as the present invention, discloses a removable adhesive tape having a highly extensible and substantially inelastic backing coated with a layer of pressure sensitive adhesive. The adhesive tape can be removed from a substrate without damaging the substrate by stretching the tape in a direction substantially parallel to the surface of the substrate. The tape backing has a lengthwise elongation at break of from about 150% to about 1200%, a Young's modulus of at least about 2,500 psi to about 72,500 psi, and an elastic recovery of less than about 50% after being stretched and removed. PCT International Publication No. WO 95/06691 discloses removable foam adhesive tape comprising a backing including a layer of polymeric foam, and a layer of pressure-sensitive adhesive coated on at least one surface of the backing. The foam layer of the backing has a thickness of about 30 to about 1000 mils, and the backing has a lengthwise elongation at break of from about 50% to about 1200%, and a Young's modulus of less than about 2,400 psi.

Commercial stretch releasing adhesive tapes include the product sold under the trade designation COMMAND by Minnesota Mining and Manufacturing Company, St. Paul, Minn., and the product sold under the trade designation POWER-STRIPS by Beiersdorf A G, Hamburg, Germany. These products are currently manufactured as discrete strips with one end of the strip including a non-adhesive pull tab to facilitate stretching of the strip during removal. The adhesive surfaces of the strip are additionally protected with a release liner.

Desirable for certain applications is a strip having a discrete length from which multiple strips of various length can be cut, or an elongated strip of indefinite length or roll of stretch releasing adhesive tape from which strips of variable length can be cut depending on the end use application. The difficulty with providing a long length of stretch releasing tape which can be cut to a selected length is the ability to provide a non-adhesive pull tab at a specific location on the cut strip, usually at the end of the cut strip, to serve as a grasping area for stretching the strip from a substrate at the time of removal.

PCT International Publication No. WO 98/06652 discloses a length cutting fixture which can be used to form a non-adhesive pull tab or "gripper" at the end of a long length of a conventional single-sided adhesive tape. The length cutting fixture also serves to cut the long length of tape, now including the gripper, to any desired length. The gripper is formed by folding the end of the tape back onto itself. Such a length cutting fixture, however, cannot be used to form a non-adhesive pull tab on a double-sided adhesive tape.

It is therefore desirable to provide a stretch releasing adhesive tape article in a long length which can be cut into discrete strips having any selected length, wherein each strip can be provided with a non-adhesive pull tab at a specific location to serve as a stretch removal tab which can be grasped and pulled by a user to remove the adhesive tape from a substrate.

SUMMARY OF THE INVENTION

The present invention provides a stretch releasing adhesive tape article including an elongate length of stretch releasing adhesive tape and a segmented liner arranged on the adhesive that can be used to form a manually engageable pull tab at a selected location on a discrete strip of tape cut from the long length of tape. The adhesive tape article can be a flat strip or can be wound upon itself to form a roll. The segmented liner allows the adhesive tape to be made in a long length which can be wound into a roll, allows a user to cut a discrete strip from the long length depending on the end use application for the strip, and allows the user to form a non-adhesive pull tab at any location on the strip which can be grasped and pulled by the user to stretch remove the tape from an associated substrate. For easy access, the pull tab is preferably formed adjacent an end of the adhesive strip.

More particularly, the stretch releasing adhesive tape article includes an elongate length of stretch releasing tape having first and second oppositely facing major surfaces and first and second ends with at least one of the first and second major surfaces being adhesive, and at least a first segmented liner arranged on an adhesive surface. A preferred stretch releasing adhesive tape is available under the COMMAND trade designation from Minnesota Mining and Manufacturing Company, St. Paul, Minn. The liner can be a silicon coated paper.

In one embodiment, the segmented liner is formed from separate, individually removable, aligned segments arranged along the adhesive surface or surfaces of the adhesive tape. In another embodiment, the segmented liner is a single liner including at least one frangible connection dividing the liner into segments that can be readily separated. The frangible connection can be formed by cutting slits into the liner, thereby leaving a connecting portion between adjacent segments that can be easily broken, by punching holes in the liner to form perforations, or by other known techniques. In addition, the frangible connection can be formed without creating a physical discontinuity in the liner by providing a line of weakness in the liner by, for example, scoring, notching, or creasing the liner, thereby allowing a user to easily tear the liner along the line of weakness.

By forming the segmented liner from a plurality of individual liners each of which define a segment, or from a single liner including one or more frangible connections or lines of weakness which define individual segments, selected liner segments can be separated from the rest and left on the adhesive tape to form the pull tab while the remaining liner segments can be removed from the tape to expose an associated adhesive surface. For the embodiment where the segmented liner is formed with frangible connections or lines of weakness thereby forming a liner with a series of interconnected segments, a series of connected liner segments to be removed from the adhesive tape can be removed simultaneously.

If both the first and second major surfaces are adhesive, segmented liners can be provided on both surfaces. Alternatively, one release liner having a width approximately twice that of the tape can be used. Such a liner allows the tape to be wound into a roll without bonding to itself and further allows the liner to be folded onto the opposite major surface to form a pull tab. The liner can include a longitudinally extending lower adhesion surface portion normally in contact with the tape adhesive surface, and a higher adhesion surface portion normally extending beyond the tape which can be folded back onto the tape and form a strong adhesive bond therewith to form a pull tab that will not readily debond from the adhesive tape. The liner surface opposite the surface with the lower and higher adhesion surface portions can include a releasable surface portion and a high friction surface portion with a rubber-like or textured surface to aid in gripping the liner portion which has been formed into the pull tab.

In a specific embodiment, the liner includes transversely extending wing portions and a longitudinally extending connecting portion forming the frangible connection between adjacent wing portions. In another embodiment, the longitudinally extending connecting portion defines a center portion of the liner, whereby pairs of aligned wing portions extend outwardly in opposite directions from the connecting center portion which can be folded back onto the tape to form the pull tab.

BRIEF DESCRIPTION OF THE DRAWING

The present invention will be further described with reference to the accompanying drawings, in which:

FIG. 6b is a perspective view of a discrete strip which has been cut from the roll of FIG. 6a.

FIG. 7b is a perspective view of a discrete strip which has been cut from the roll of FIG. 7a.

DETAILED DESCRIPTION

Figure 1:
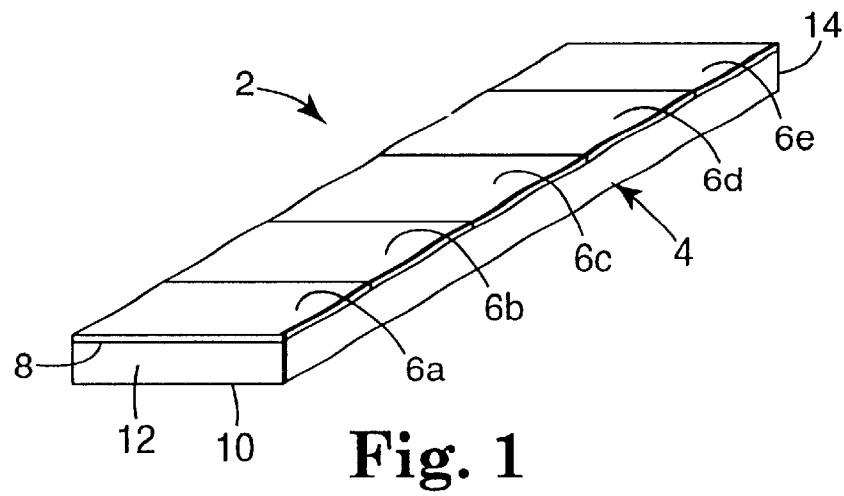
FIG. 1 is a perspective view of a stretch releasing adhesive tape article according to the invention.

Referring now to the Figures, wherein like reference numerals are used to designate like features throughout, and first to FIG. 1, there is shown a stretch releasing adhesive tape article 2 including an elongate stretch releasing adhesive tape 4 and a plurality of individual liners 6a–e arranged to cover an adhesive first major surface 8 of the stretch releasing adhesive tape 4. While shown as a discrete strip, the stretch releasing tape article 2 can be formed as an elongated strip having an indefinite length from which multiple strips of selected length can then be cut depending on the end use application. The adhesive tape article 2 can also be wound upon itself to form a roll.

The stretch releasing adhesive tape 4 includes adhesive first major surface 8, an opposite non-adhesive second major surface 10, and first 12 and second 14 ends. The stretch releasing adhesive tape 4 can be any pressure-sensitive adhesive tape that can be adhered firmly to a substrate and thereafter removed therefrom by stretching. Such pressure sensitive adhesive tapes can include an elastic backing, a highly extensible and substantially inelastic backing, or can be a tape formed of a solid, elastic pressure sensitive adhesive. Suitable stretch releasing tapes are described in U.S. Pat. No. 4,024,312 (Korpman), German Patent No. 33 31 016, U.S. Pat. No. 5,516,581 (Kreckel et al.), and PCT International Publication No. WO 95/06691 (Bries et al). In addition, the stretch releasing adhesive tape can include a splittable layer such as the layers described in PCT International Publication No. WO 98/21285, or a re-fastenable layer such as the layers described in PCT International Publication No. WO 99/31193.

The liners 6a–e can be any conventional readily removable liner. Typical liners include a backing formed of, for example, paper or a polymeric film such as polyethylene, polypropylene, or polyester, which is coated with a release agent such as silicone, a fluorochemical, or other low surface energy based release material. A preferred liner is silicone coated paper. The liners can be printed with lines, brand indicia, or other information.

If tape 4 is formed of a naturally tacky composition such that first surface 8 and second surface 10 are both initially adhesive, second surface 10 can be rendered non-adhesive using a conventional treatment such as by coating it with a suitable film, paper, powder, foam, or ink. If, on the other hand, the tape is formed with a non-adhesive backing that is then coated with adhesive, second surface can be made non-adhesive by simply not coating the surface with adhesive.

Figure 2:
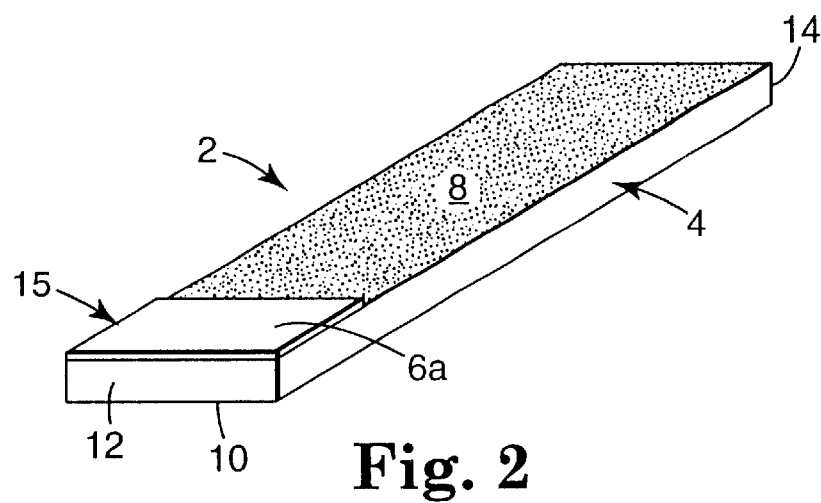
FIG. 2 is a perspective view of a stretch releasing article with a selected portion of the liner removed to form a pull tab and expose an adhesive surface of the tape.

In accordance with a characterizing feature of the invention, each liner 6a–e can be individually removed from adhesive first major surface 8. By allowing each liner to be removed separately, selected liners can be removed to expose a corresponding portion of an adhesive surface, while one or more selected liners can be left on the adhesive tape to form a pull tab. As shown in FIG. 2, liners 6b–e are removed to expose a selected portion of adhesive first major surface 8 to allow the tape 4 to be affixed to an object, substrate, surface, or the like (not shown), while liner segment 6a remains on adhesive surface 8 adjacent the liner first end 12 to form a non-adhesive pull tab 15 which can be grasped by a user to stretch the tape during the removal process, thereby to remove the tape from the object or substrate to which it has been affixed.

Figure 3:
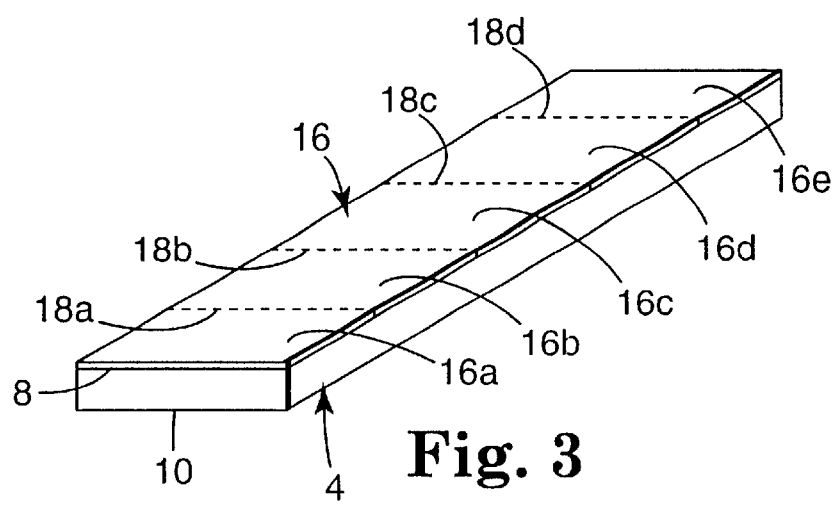
FIG. 3 is a perspective view of a second embodiment of the invention including a perforated liner on one side of the tape.

FIG. 3 shows an alternate embodiment of the invention in which a single perforated liner 16 has replaced the plurality of liners 16a–e of FIG. 1. The liner 16 includes a plurality of frangible or easily broken connections formed by registered perforations 18a–d dividing the liner 16 into segments 16a–e each of which can be easily separated from an adjacent segment along a perforation line and individually removed from adhesive surface 8. When liner segments 16b–e are removed from the adhesive tape 4 by first peeling interconnected liner segments 16b–e from adhesive surface 8 and then separating liner segment 16a from liner segment 16b along perforation 18a, a tape strip having a pull tab 15 as shown in FIG. 2 is produced. The advantage of using a single perforated liner rather than separate liners as described in reference to FIG. 1 is that a single perforated liner simplifies the use of the adhesive tape article by allowing a series of connected liners to be removed simultaneously in a single step after it is determined which liner segments are to be removed from the tape and which liner or liners are to remain on the tape and serve as a pull tab. Alternatively, the frangible connections can be formed by scoring, notching, creasing, or otherwise forming a line of weakness in the liner to provide for easy separation of the liner at selected intervals.

To use the adhesive tape article of FIG. 3, liner segments 16b–e are first peeled away from adhesive surface 8 starting at the second end 14 to expose adhesive surface 8. Connected liner segments 16b–e are then separated from liner segment 16a by tearing along perforation 18a, whereby connected liner segments 16b–e can be completely removed from the adhesive surface 8. Segment 16a is left in place on the adhesive surface 8 adjacent the first end 12 to serve as a non-adhesive pull tab 15. The adhesive strip can then be adhered to an object or substrate by applying firm pressure to the non-adhesive second surface 10 of the tape.

Figure 4:
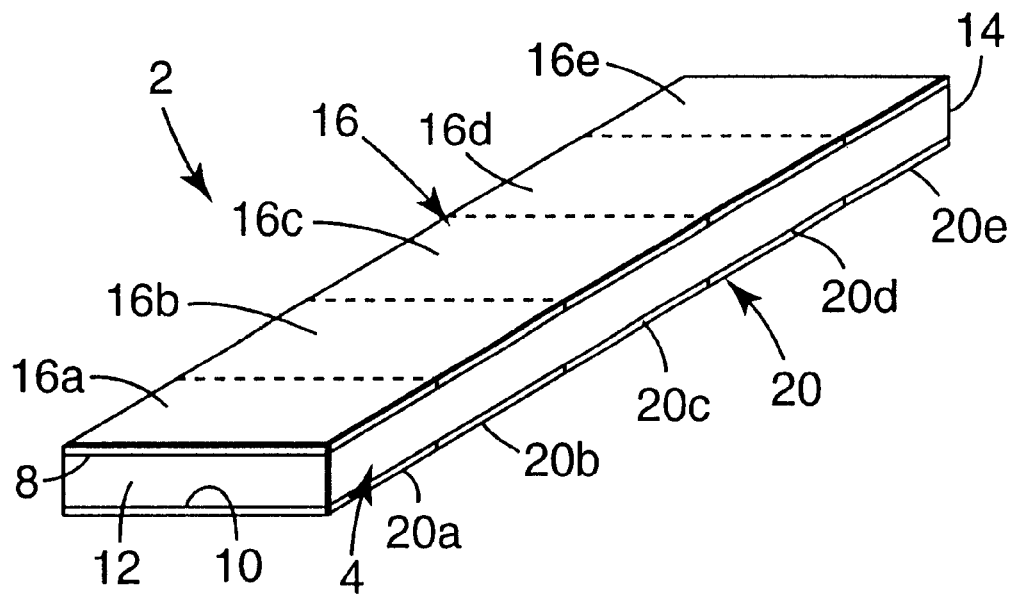
FIG. 4 is a perspective view of a third embodiment of the invention including perforated liners on both sides of the tape.
Figure 5:
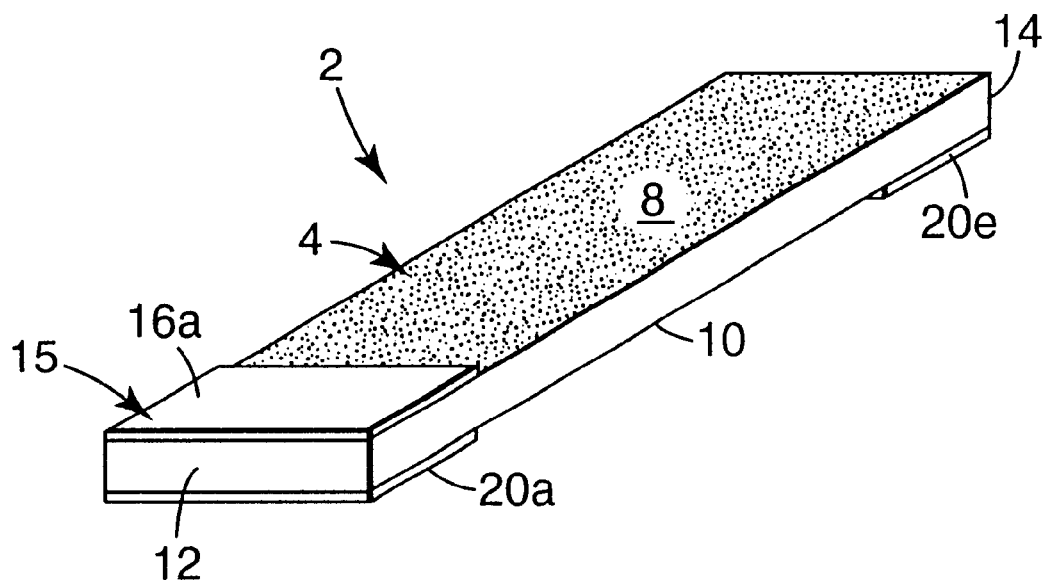
FIG. 5 is a perspective view of the stretch releasing tape article of FIG. 4 after selected liner segments have been removed from opposite adhesive surfaces of the tape to expose associated adhesive surfaces and form a pull tab.

FIGS. 4 and 5 show a stretch releasing adhesive tape article 2 similar to the article in FIG. 2 except second surface 10 is adhesive and is provided with a second perforated release liner 20 including liner segments 20a–e covering second surface 10. In order to form a symmetric pull tab 15, liner segments 16a–16e are aligned with liner segments 20a–20e. The adhesive tape article of FIGS. 4 and 5 is used in the same manner as the article of FIGS. 1 and 3 except liner segments 20b–d are removed from adhesive second surface 10 after the tape has been bonded to a substrate. FIG. 4 shows the adhesive tape article prior to use with perforated liners 16 and 20 in place on surfaces 8 and 10, respectively, and FIG. 5 shows the adhesive article 2 after selected liner segments 16b–e and 20b–d have been removed to expose the adhesive surfaces 8 and 10. Aligned liner segments 16a and 20a meanwhile remain adhered to opposite surfaces of the adhesive tape 4 adjacent the first end 12 to form the pull tab 15. In addition, liner segment 20e is left adhered to second adhesive surface 10 adjacent the second end 14 so that the first and second adhesive surfaces will debond from their respective surfaces at different times. Controlling the timing of debonding of the first and second adhesive surfaces from their respective surfaces serves to minimize snap back and catapulting as described in PCT International Publication No. WO 97/07172.

FIGS. 6a–e show a stretch releasing tape article 102 wound into a roll 122 in accordance with another embodiment of the invention. The adhesive tape article 102 includes a first adhesive surface 108 and a second adhesive surface 110 covered by a liner 124. Liner 124 is preferably stretchable or extensible to prevent the adhesive tape article from binding when wound upon itself, thereby facilitating the formation of a roll. As shown most clearly in FIG. 6e, liner 124 includes a plurality of liner segments 124a–c defined by transverse slits 128a–c cut into the liner 124. It will be recognized that liner segments 124a–c could also be defined by perforations or other frangible connections, or each liner segment could be a separate liner as described in reference to FIG. 1. The slits 128a–c extend from a first side edge 130 of the liner 124, toward a second side edge 132 of the liner 124. The slits are spaced from the second side edge 132, thereby defining a continuous longitudinally extending frangible connecting portion 124f extending along and defining the second side edge 132 of the liner 124. The liner 124 is approximately twice as wide as the width of the adhesive tape 104 to allow one or more liner segments 126a–c to be folded back onto the first adhesive surface 108 of the adhesive tape to form a pull tab. The liner 124 can also be folded back onto itself to protect the segments 124a–c and prevent them from being damaged prior to being folded onto the first adhesive surface 108 to form the pull tab.

Figure 6A:
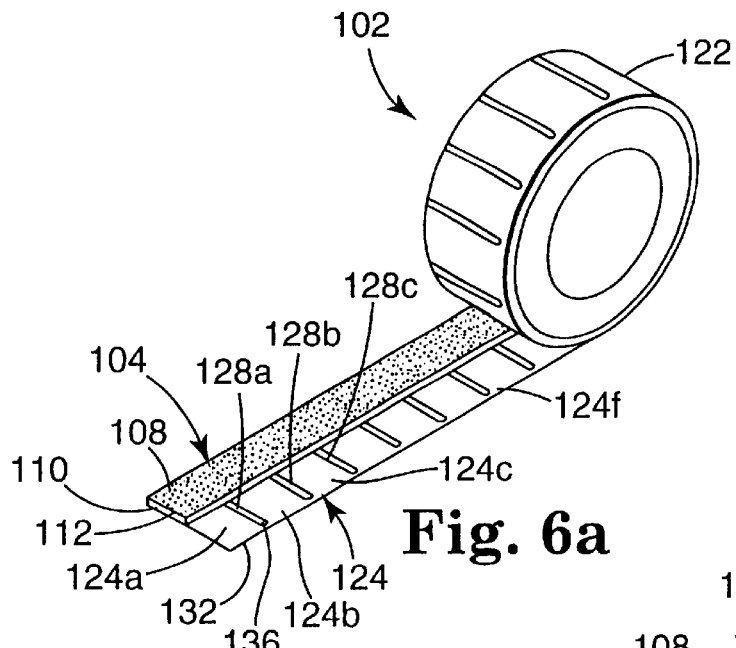
FIG. 6a is a perspective view of a fourth embodiment of the invention in the form of a roll.
Figure 6B:
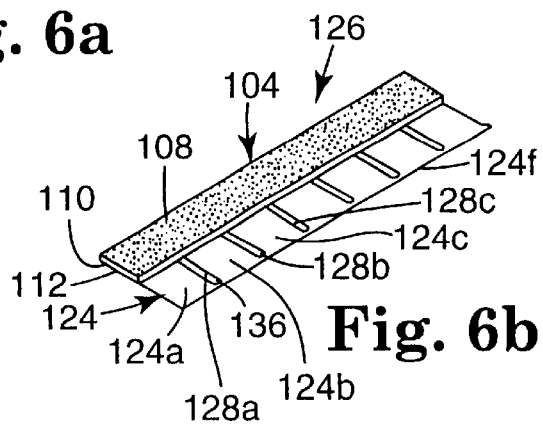
Figure 6C:
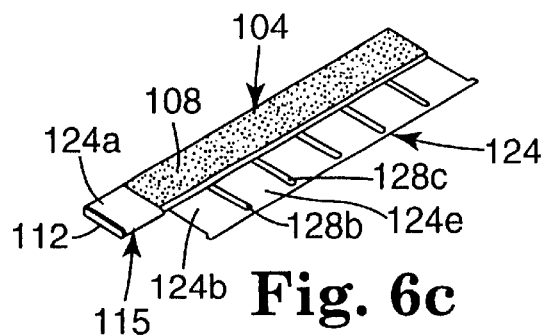
FIG. 6c is a perspective view of the strip of FIG. 6b after a liner segment has been folded over onto the tape at one end of the tape to form a pull tab.
Figure 6D:
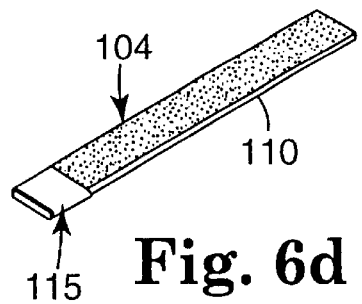
FIG. 6d is a perspective view of the strip of FIG. 6c after selected liner segments have been removed from the tape to expose the adhesive surface of the tape.
Figure 6E:
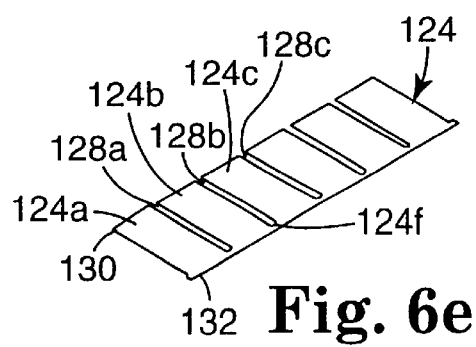
FIG. 6e is a perspective view of the connected liner segments after they have been removed from the tape of FIG. 6d.

To use the adhesive tape article 102, a discrete length 126 is first cut from the roll 122 preferably along a frangible connection as shown in FIG. 6b. The frangible connection 136 between adjacent liner segments 124a and 124b is then broken so that liner segment 124a adjacent the first end 112 of the tape can be folded back onto the first adhesive surface 108 of the tape to form the pull tab 115 as shown in FIG. 6c. The first adhesive surface 108 can then be affixed to an object or substrate by applying pressure to the connected liner segments 124b, 124c remaining adhered to the second surface 110. Once firmly bonded, the remaining interconnected liner segments can be removed to expose the second adhesive surface 110 as shown in FIG. 6d so an object can be affixed thereto.

By providing a liner 124 that can be folded back onto the first adhesive surface 108 of the adhesive tape 104, the embodiment of FIGS. 6a–e requires only a single release liner arranged on one side of the adhesive tape 104 to form the pull tab 115. The liner 124 also serves to prevent the adhesive tape from bonding to itself when the tape is wound into a roll since when wound into a roll, first adhesive surface 108 is arranged adjacent the liner 124 and is therefore separated from the second adhesive surface 110 by the liner 124. Thus, the first adhesive surface 108 and second adhesive surface 110 do not come into contact and cannot adhere to one another. As the roll 122 is unwound, the liner 124 releases from the first adhesive surface 108 and remains adhered to the second adhesive surface 110.

Figure 7A:
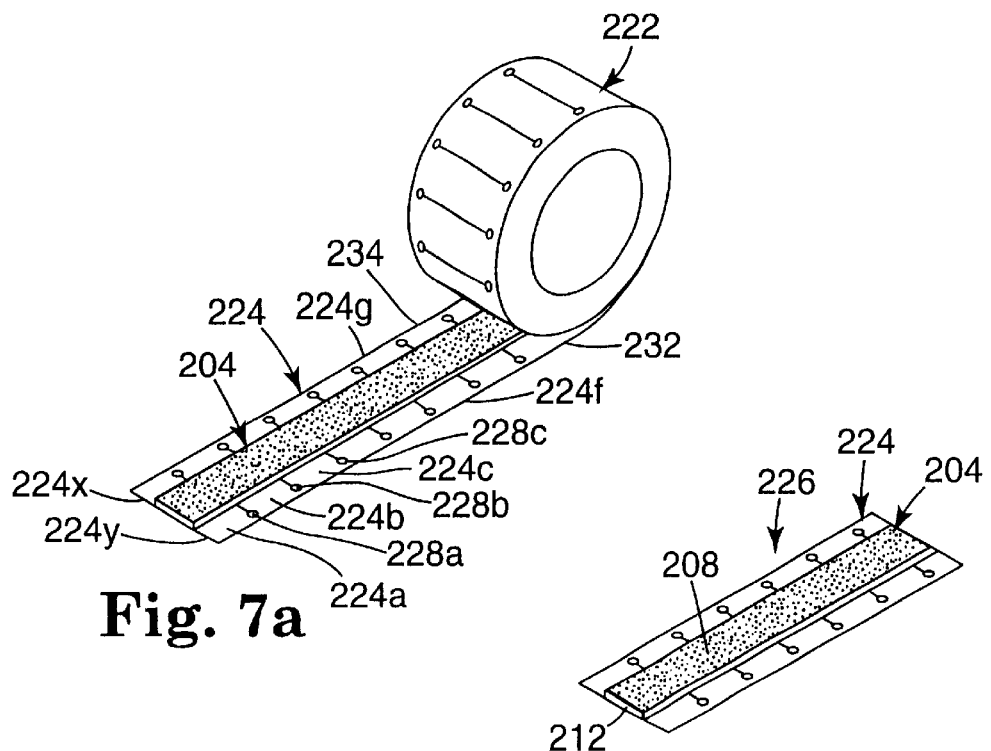
FIG. 7a is a perspective view of a fifth embodiment of the invention in the form of a roll.
Figure 7B:
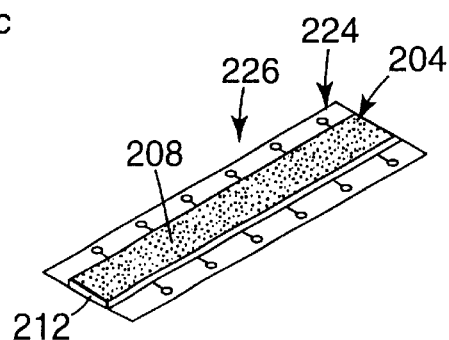
Figure 7C:
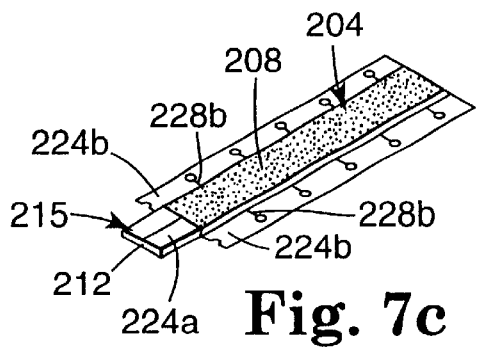
FIG. 7c is a perspective view of the strip of FIG. 7b after a liner segment has been folded over onto the tape at one end of the tape to form a pull tab.
Figure 7D:
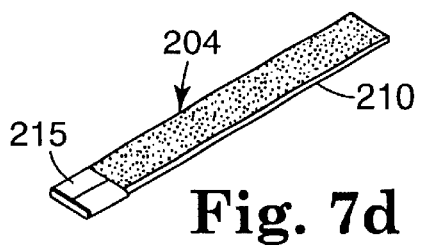
FIG. 7d is a perspective view of the strip of FIG. 7c after selected liner segments have been removed from the tape to expose a second adhesive surface of the tape.
Figure 7E:
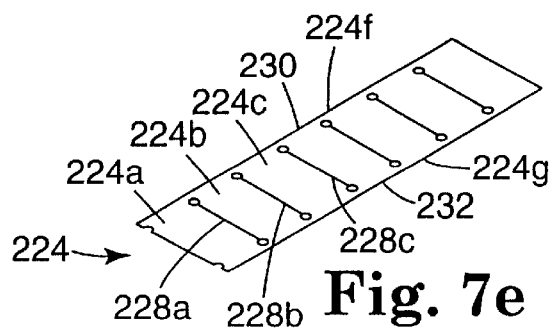
FIG. 7e is a perspective view of the connected liner segments after they have been removed from the tape of FIG. 7d.

FIGS. 7a–e show a roll of tape 222 including a stretch releasing tape 204 and a liner 224. Features in FIGS. 7a–e that are functionally similar to those of FIGS. 6a–e are designated with like numerals incremented by 100. The liner 224 is arranged centrally on the tape 204 so that opposite side portions 224x, 224y of the liner extend outwardly beyond each side of the tape 204. Liner 224 is preferably stretchable or extensible to prevent the adhesive tape article from binding when wound upon itself, thereby facilitating the formation of a roll. As shown most clearly in FIG. 7e, liner 224 includes a plurality of segments 224a, 224b, 224c defined by a plurality of transverse slits 228a, 228b, 228c, and a pair of continuous connecting portions 224f, 224g extending longitudinally along each side of the liner 224 between the ends of the slits 228a, 228b, 228c and the first 230 and second 232 side edges of the liner 224. The connecting portions 224f, 224g serve as frangible connections between adjacent liner segments. To use the adhesive tape article of FIG. 7, a strip 226 of tape having a discrete length is first cut from the roll 222 preferably along a frangible connection, as shown in FIG. 7b. The side portions of liner segment 224a adjacent the first end 212 of the strip 226, which normally extend outwardly beyond the adhesive tape 204, are then folded back onto the tape 204 to form a pull tab 215 as shown in FIG. 7c. The exposed first adhesive surface 208 is then affixed to a substrate and firm pressure is applied to the liner 224 to create a more complete and effective bond between the tape and the substrate to which the tape has been applied. The remaining liner segments 224b, 224c are then removed to expose the second adhesive surface 210 as shown in FIG. 7d, so that an object or the like can be bonded thereto.

Figure 8A:
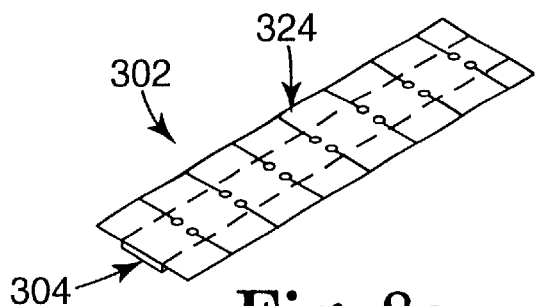
FIGS. 8a–8c are perspective views of a sixth embodiment of the invention showing the adhesive tape article before the liner has been removed, with the liner removed to expose an adhesive surface of the tape, and the liner after it has been removed from the tape, respectively.
Figure 8C:
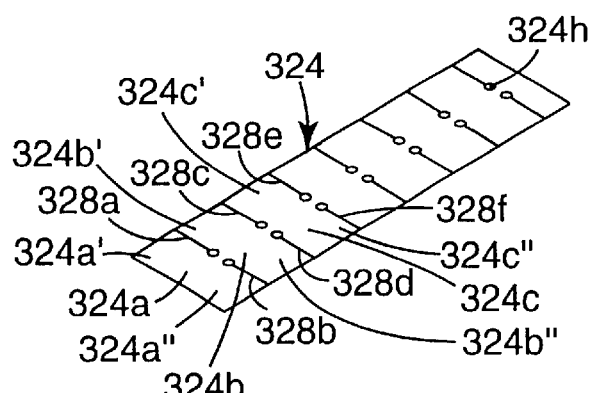
Figure 8B:
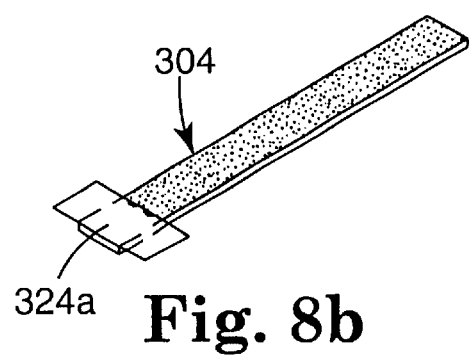

FIGS. 8a–c show an adhesive tape article 302 including an adhesive tape 304 and an alternate liner 324. As shown in FIG. 8c, the liner includes spaced pairs of aligned transverse slits 328a, 328b; 328c, 328d; 328e, 328f extending inwardly from opposite outer side edges of the tape, thereby defining a longitudinally extending continuous connecting center portion 324h, and a plurality of liner segments 324a, 324b, 324c each having wing portions 324a', 324a", 324b', 324b", 324c', 324c" extending outwardly in opposite directions from the connecting portion 324h. The connecting portion 324h can be easily broken between adjacent liner segments to allow a selected portion of the liner to be removed and thereby expose an associated adhesive surface. With the liner of FIG. 8, however, only one frangible connection must be broken to separate adjacent liner segments whereas the liner of FIG. 7 requires two frangible connections to be broken.

Figure 9A:
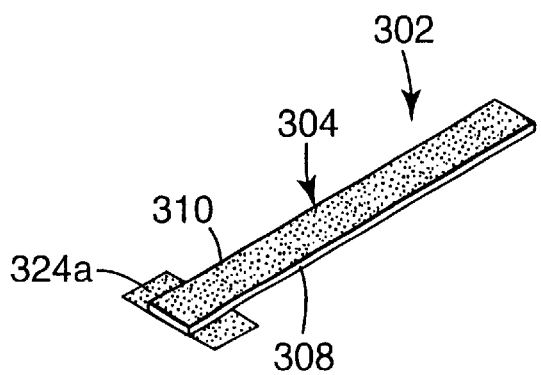
FIGS. 9a and 9b are perspective views of a seventh embodiment of the invention showing a release liner capable of differential adhesion to the adhesive tape.
Figure 9B:
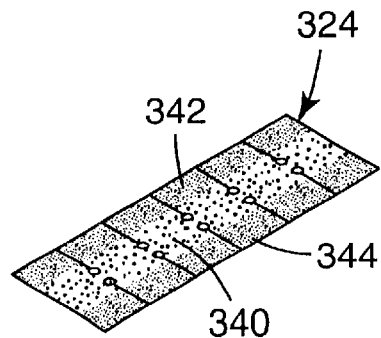

FIGS. 9a and 9b show an adhesive tape article 302 similar to the adhesive tape article shown in FIGS. 8a-c except the adhesive tape article of FIGS. 9a and 9b includes a liner 324 having a first longitudinally extending lower adhesion surface portion 340 located along the center of the liner 324, and a pair of longitudinally extending higher adhesion surface portions 342, 344 extending outwardly in opposite directions from the lower adhesion surface portion 340 to provide differential adhesion levels with the adhesive tape 304. The lower adhesion center surface portion 340 is normally in contact with the first adhesive surface 308 and forms a lower level bond therewith so that selected liner segments can be readily removed from the first adhesive surface 308 to expose the adhesive. The lower adhesion surface portion can be, for example, silicon treated release paper which serves to prevent the liner 324 from forming a strong adhesive bond with adhesive tape 304. The higher adhesion surface portions 342, 344 normally extend beyond the side edges of the tape as shown in FIG. 9a, and serve to form a pull tab when folded back onto the adhesive tape second adhesive surface 310. The higher adhesion surface portions 342, 344, however, are capable of forming an adhesive bond with the tape second adhesive surface 310 which is stronger than the adhesive bond formed between the lower adhesion surface portion 340 and the adhesive tape 304. The higher level of adhesion between the folded portions and the tape is desirable since after forming the pull tab, the folded liner portions will have a tendency to debond from the tape. The stronger adhesive bond formed between the folded higher adhesion surface of the liner and the tape prevents this debonding from occurring. The higher adhesion surface can be, for example, paper that has not been treated with silicon. In addition, the surface opposite the lower adhesion surface portion 340 and higher adhesion surface portions 342, 344 can include a release portion generally opposite lower adhesion surface portion 340 which contacts the second adhesive surface 310 when the tape is wound into a roll, and a high friction surface generally opposite higher adhesion surface portions 342, 344 to aid in gripping the pull tab during stretch removal. The high friction surface can be a rubber-like surface, a textured surface, or other conventionally known high friction surfaces.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A stretch releasing adhesive tape article comprising:
   (a) an elongate length of stretch releasing tape having first and second oppositely facing major surfaces, at least said first surface being adhesive; and
   (b) a first liner arranged on said first adhesive surface, said liner including at least one frangible connection dividing said liner into segments that can be separated from adjacent segments and individually removed from said first adhesive surface, thereby to expose a selected portion of said first adhesive surface, whereby at least one segment remains adhered to said first adhesive surface to serve as a pull tab which can be grasped by a user during stretch removal of the tape from a substrate.

2. An adhesive tape article as defined in claim 1, wherein the length of tape is wound upon itself to form a roll, whereby said second adhesive surface is arranged adjacent said liner.

3. An adhesive tape article as defined in claim 2, wherein said frangible connection is a formed by perforations in said liner.

4. An adhesive tape article as defined in claim 3, wherein each of said first and second surfaces is adhesive, and further comprising a second perforated liner arranged on said second adhesive surface opposite said first perforated liner, wherein the perforations of said first and second liners are generally aligned.

5. An adhesive tape article as defined in claim 4, wherein each said release liner is stretchable.

6. An adhesive tape article as defined in claim 5, wherein each said release liner is silicon coated paper.

7. An adhesive tape article as defined in claim 6, wherein said pull tab is formed adjacent an end of the discrete strip of tape.

8. An adhesive tape article as defined in claim 1, wherein each of said tape first and second surfaces is adhesive.

9. An adhesive tape article as defined in claim 8, wherein said frangible connection is defined by a transverse slit cut at least partially through said liner.

10. An adhesive tape article as defined in claim 9, wherein said liner has a width approximately twice the width of said tape, thereby to allow said first liner to be folded onto said second surface opposite said first adhesive surface, and thereby form said pull tab.

11. An adhesive tape article as defined in claim 10, wherein said liner includes a first surface having a longitudinally extending lower adhesion surface portion normally in contact with said tape first adhesive surface, and a higher adhesion surface portion normally extending outwardly from said lower adhesion surface portion beyond said tape first adhesive surface, said higher adhesion surface portion being foldable into contact with said tape second surface to form said manually engageable pull tab, wherein said higher adhesion surface portion is capable of forming a stronger adhesive bond with said tape than said lower adhesion surface portion.

12. An adhesive tape article as defined in claim 11, wherein said liner includes a textured second surface opposite said first surface to aid a user in gripping said pull tab during stretch removal.

13. An adhesive tape article as defined in claim 12, wherein said liner includes wing portions and a longitudinally extending continuous connecting portion connecting said wing portions, said connecting portion being easily broken between adjacent wing portions so that a selected portion of said liner can be removed to expose an associated adhesive surface.

14. An adhesive tape article as defined in claim 13, wherein said longitudinally extending continuous connecting portion defines a side edge of said liner.

15. An adhesive tape article as defined in claim 13, wherein said longitudinally extending continuous connecting portion defines a center portion of said liner, and said liner contains a pair of aligned transversely spaced slits extending inwardly from opposite side edges of said liner toward said longitudinally extending continuous connecting portion, thereby defining wing portions extending outwardly in opposite directions from said continuous connecting portion.

16. A stretch releasing adhesive tape article comprising:
(a) an elongate length of stretch releasing tape having first and second oppositely facing major surfaces, at least said first surface being adhesive; and
(b) a liner arranged on said first adhesive surface, said liner having registered perforations defining individual liner segments, whereby a selected segment of said release liner can be removed from said first adhesive surface, thereby to expose a selected portion of said first adhesive surface, and further whereby at least one segment remains adhered to said first adhesive surface to serve as a pull tab which can be grasped by a user during stretch removal of the tape from a substrate.

17. A stretch releasing adhesive tape article comprising:
(b) a length of stretch releasing tape having first and second oppositely facing major surfaces, at least said first surface being adhesive; and
(b) a liner arranged on said first adhesive surface, said liner including frangible connection means for allowing a user to remove a selected portion of said liner from said first adhesive surface while further allowing a selected portion of said liner to remain on said first adhesive surface, thereby to form a manually engageable pull tab for use during stretch removal of the tape from a substrate.

18. A stretch releasing adhesive tape article comprising:
(a) an elongate length of stretch releasing tape having first and second oppositely facing major surfaces, at least said first surface being adhesive; and
(b) a plurality of liners arranged on said first adhesive surface, each said liner being selectively removable from said first adhesive surface to expose a selected portion of said first adhesive surface, whereby at least one liner can remain adhered to said first adhesive surface to serve as a pull tab which can be grasped by a user during stretch removal of the tape from a substrate.

19. An adhesive tape article as defined in claim 18, wherein said liners are connected with frangible connections, whereby a series of connected liners can be removed from said first adhesive surface in one step.

20. A double sided stretch releasing adhesive tape article comprising:
(a) an elongate length of stretch releasing tape having first and second oppositely facing adhesive major surfaces;
(b) a first liner arranged on said first adhesive surface, said liner including at least one frangible connection dividing said liner into segments that can be separated from each other and individually removed from said first adhesive surface, thereby to expose a selected portion of said first adhesive surface; and
(c) a second liner arranged on said second adhesive surface, said liner including at least one frangible connection dividing said liner into segments aligned with said first liner segments that can be separated from adjacent segments and individually removed from said first adhesive surface, thereby to expose a selected portion of said first adhesive surface;
wherein at least one segment can remain adhered to each of said first and second adhesive surfaces to form a non-adhesive pull tab that can be grasped by a user during stretch removal of the tape from a substrate.

21. A method of forming a non-adhesive pull tab at a selected location on a discrete strip cut from a length of tape of stretch releasing adhesive tape, comprising the steps of:
(a) providing an elongate length of stretch releasing tape having first and second oppositely facing major surfaces, at least said first surface being adhesive;
(b) providing a first liner arranged on said first adhesive surface, said liner including at least one frangible connection dividing said liner into segments that can be separated from adjacent segments; and
(c) removing selected segments from said first adhesive surface, thereby to expose a selected portion of said first adhesive surface, wherein at least one segment remains adhered to said first adhesive surface to serve as a pull tab that can be grasped by a user during stretch removal of the tape from a substrate.

* * * * *

UNITED STATES PATENT AND TRADEMARK OFFICE
CERTIFICATE OF CORRECTION

PATENT NO.    : 6,641,910 B1
DATED         : November 4, 2003
INVENTOR(S)   : Bries, James L.

It is certified that error appears in the above-identified patent and that said Letters Patent is hereby corrected as shown below:

Title page,
Item [56], References Cited, U.S. PATENT DOCUMENTS, in the following reference "4,024,312 A*    5/1977    Korpman..........428/343"; after "A" please delete the asterisk "*"

Column 8,
Line 64, delete "a"

Column 9,
Line 8, delete "silicon" and insert in place thereof -- silicone --.

Column 10,
Line 2, delete "(b)" and insert in place thereof -- (a) --.

Signed and Sealed this

Twentieth Day of July, 2004

JON W. DUDAS
*Acting Director of the United States Patent and Trademark Office*